US009803977B2

(12) United States Patent
Fuchs

(10) Patent No.: US 9,803,977 B2
(45) Date of Patent: Oct. 31, 2017

(54) APPARATUS AND METHOD FOR BRIDGE ASSEMBLY

(71) Applicant: Paul A. Fuchs, Leesburg, VA (US)

(72) Inventor: Paul A. Fuchs, Leesburg, VA (US)

(73) Assignee: Fuchs Consulting, Inc., Leesburg, VA (US)

( * ) Notice: Subject to any disclaimer, the term of this patent is extended or adjusted under 35 U.S.C. 154(b) by 508 days.

(21) Appl. No.: 14/160,993

(22) Filed: Jan. 22, 2014

(65) Prior Publication Data

US 2014/0207410 A1  Jul. 24, 2014

Related U.S. Application Data

(60) Provisional application No. 61/849,245, filed on Jan. 23, 2013.

(51) Int. Cl.
*G01B 21/04* (2006.01)
(52) U.S. Cl.
CPC .................... *G01B 21/04* (2013.01)
(58) Field of Classification Search
None
See application file for complete search history.

(56) References Cited

U.S. PATENT DOCUMENTS

2010/0161095 A1* 6/2010 Lindgren ............ G06F 17/5095
700/98

OTHER PUBLICATIONS

Paul A. Fuchs, "Instrumentation to Aid in Steel Bridge Fabrication, Final Report for Highway IDEA Project 127", Mar. 2009, Transportation Research Board of the National Archives.*
P.A. Fuchs et al.: "Applications of Laser-Based Instrumentation for Highway Bridges", Journal of Bridge Engineering, ASCE, vol. 9, No. 6, pp. 541-549, Nov./Dec. 2004.
P. A. Fuchs: "Laser Instrumentation to Aid in Steel Bridge Fabrication", presentation material from the Transportation Research Board Meeting in a committee meeting, Jan. 16, 2008.
P. A. Fuchs: "Laser Instrumentation to Aid in Steel Bridge Fabrication", Conference paper, published and distributed, Structural Materials Technology, NDE/NDT for Highway and Bridges 2008.
P. A. Fuchs: Poster material displayed at the Transportation Research Board Meeting, Jan. 2009.
P. A. Fuchs: "Instrumentation to Aid in Steel Bridge Fabrication", IDEA Program Final Report, Transportation Research Board, National Research Council, Washington, DC, Apr. 2007 through Apr. 2008, Submitted Mar. 23, 2009.

(Continued)

*Primary Examiner* — Sujoy Kundu
*Assistant Examiner* — Brent A Fairbanks
(74) *Attorney, Agent, or Firm* — Breiner & Breiner, L.L.C.

(57) ABSTRACT

Apparatus and methods are disclosed that may be integrated into a steel bridge fabrication shop to improve steel bridge fabrication. The apparatus and methods measures aspects of completely fabricated bridge girders and virtually assembles girders in order to design custom splice plates to fit girders together. The apparatus and method further comprises of a noncontact three-dimensional coordinate measurement apparatus and methods that measures aspects of a completely fabricated girder, stores measurements as a permanent record of the girder, and combines these measurements with measurements from other girders to create a virtual assembly for a steel bridge.

15 Claims, 12 Drawing Sheets

(56) References Cited

OTHER PUBLICATIONS

P. A. Fuchs: Emerging Technology in the Steel Industry, presentation material from the 44th Mid-Atlantic Quality Assurance Workshop, Feb. 10, 2011.
Fuchs Consulting, Inc.: "Steel Bridge Fabrication Laser System", Jan. 9, 2009.
Fuchs Consulting, Inc.: "Steel Bridge Fabrication Laser Measurement System", Mar. 7, 2008.
P. A. Fuchs: "Bridge Retrofit Laser System", Final Report, published research work performed for the NCHRP-IDEA Program, Sep. 30, 2012.

* cited by examiner

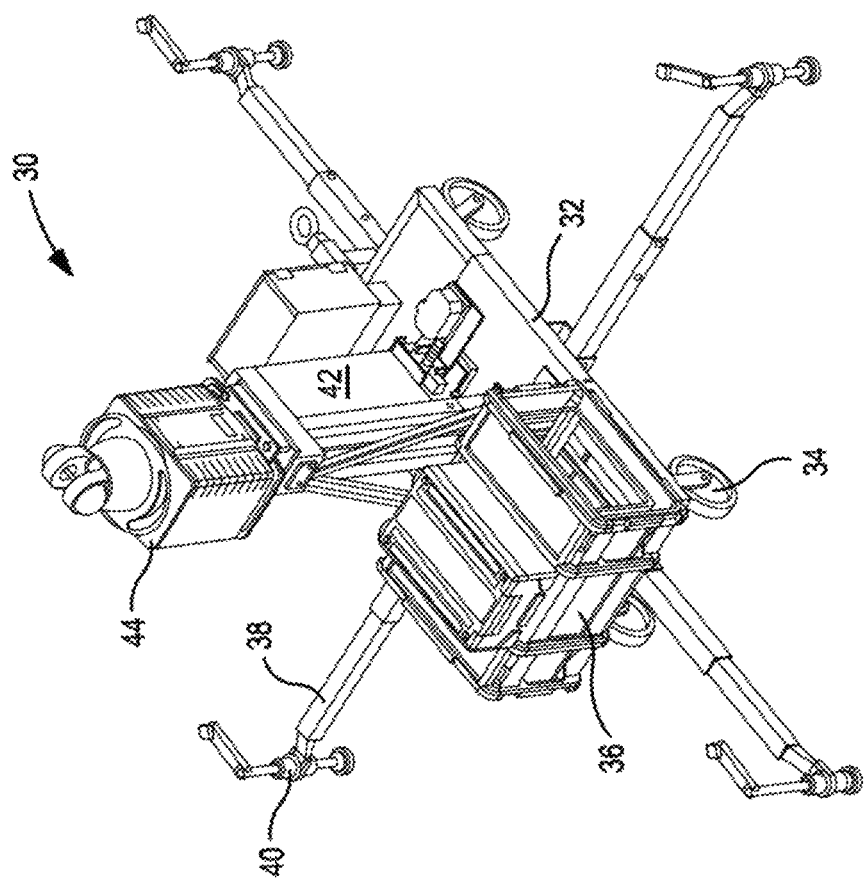
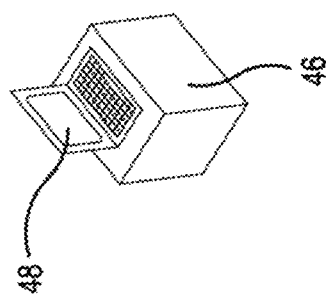
FIG. 5

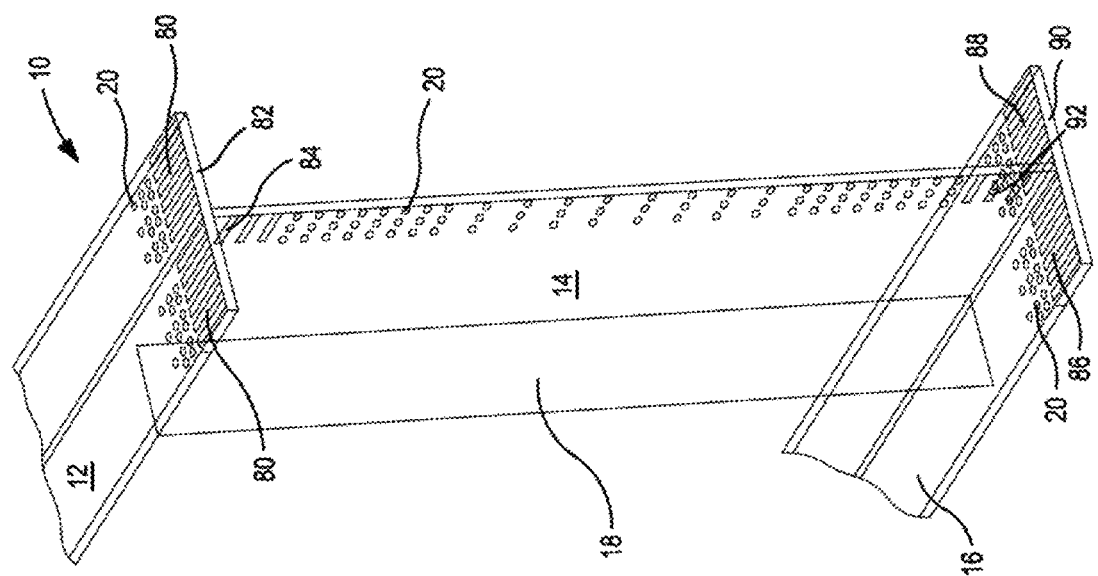

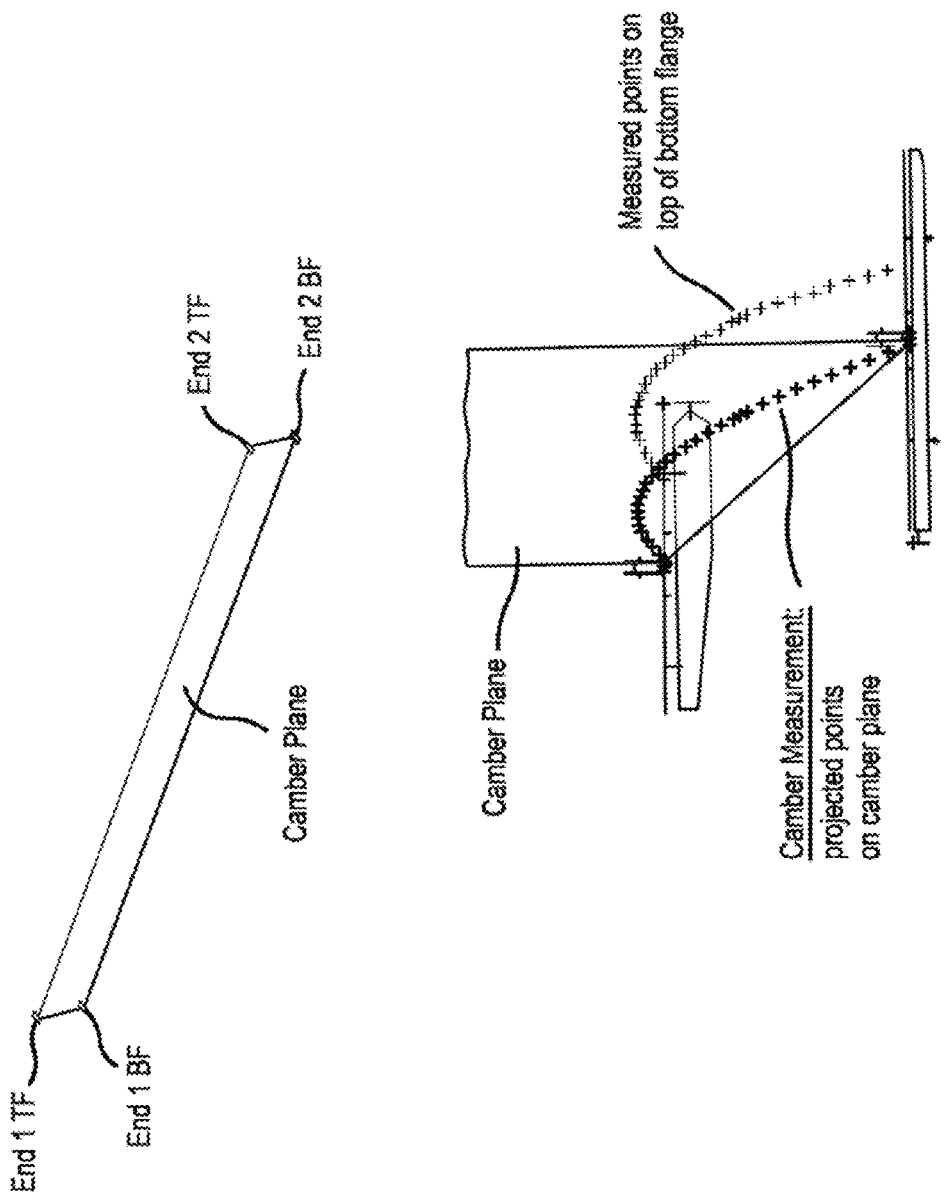

APPARATUS AND METHOD FOR BRIDGE ASSEMBLY

RELATED APPLICATION

This application claims benefit of U.S. provisional application Ser. No. 61/849,245, filed Jan. 23, 2013, entitled BRIDGE ASSEMBLY SYSTEM, and incorporated herein by reference in its entirety.

FIELD OF INVENTION

The present invention is directed to apparatus and methods for steel bridge fabrication. More specifically, the invention is directed to apparatus and methods for the noncontact measurement of various aspects of fabricated bridge girders and the virtual assembly of girders in order to design splice plates to fit girders together.

BACKGROUND OF THE INVENTION

Presently used steel bridge fabrication involves splicing together individual girders in order to create longer length bridge spans. Girders are joined together with splice plates that are bolted to each girder through holes near the ends of the girders. Girders have holes in the top and bottom flanges and in the web. Typical bridge girders may have hundreds of holes in a single splice connection.

One current fabrication practice for making the holes for the splice connection involves a match-drilling process. Referring to FIG. 1, one form of match-drilling is known as the lay down process. Girders 1 and 2 are fabricated initially with no splice holes. A pair of girders 1 and 2 to be joined with splice plates are laid on their side and manually aligned based on a string-line reference placed on a shop floor. Once aligned, splice plates with full-sized holes already in the plates are clamped to the girder pair and used as a template to match-drill the holes in both girders. This lay down process is used to make sure that all holes in the girder are in alignment with the holes in the plates.

There are variations on the process, such as the sub-drill and ream process, both collectively referred to herein as "match-drilling." This latter match-drilling process pre-drills holes in the girder smaller than the final hole diameter during fabrication of the girders. Two girders to be joined together are then blocked in an upright position and aligned. Once aligned, splice plates with full-sized holes already in the plates are clamped or pinned in the girder pair and used as a template to ream all holes in the girders to their final size. As with the lay down process, this sub-drill and ream process is used to make sure that all holes in the girder are in alignment with the holes in the splice plate.

These processes of match-drilling splice plate holes have the benefit of guaranteed hole alignment in the girders and splice plates. However, these processes are very time-consuming and expensive. Some estimates put the cost of this step in the fabrication process at 15% to 20% of the cost of a steel bridge. Additionally, match-drilling holes at the end of the fabrication process requires multiple drills at different orientations, or the repositioning of drills, and drilling on a fabricated girder, i.e. a girder where the girder flanges have been welded to a girder web. Match-drilling is, therefore, much more difficult than drilling on a flat plate.

The match-drilling processes also take up considerable floor space in the shop. Depending on the shop, the laydown area may require one-third to one-half of the floor space of the entire shop. Girders are laid on their sides and set end to end, taking up several hundred feet of space. Curved girders when set on their sides need to be appropriately blocked and can be more difficult to work with as they extend high off the shop floor.

The current apparatus and methods for bridge fabrication, therefore, have various shortcomings, including, for example, those noted above. Accordingly, there is a need in the bridge fabrication industry for a simple and less expensive means to fabricate splice plates and to generate, store and report data for as-fabricated girders and girder assembly.

OBJECTS AND SUMMARY OF THE INVENTION

A primary object of the present invention is to eliminate expensive and time consuming aspects of the current steel bridge fabrication process.

Another primary object of the invention is and to provide improved apparatus and methods for the fabrication of girders, including splice plates.

Another primary object of the present invention is to provide an apparatus and method allowing a bridge fabricator to fabricate a girder with full-sized holes earlier in the process where more precise and efficient drill equipment may be used.

A further primary object of the invention allows for the creation of custom-made spice plates. The splice holes, therefore, do not need to be placed as precisely in the girders during the fabrication process; and the custom plate can account for normal variations that occur in the fabrication process.

Another object of the invention is to provide an apparatus and method of fabrication of bridge girders wherein a three-dimensional ("3D") model of a bridge girder is generated from two-dimensional ("2D") shop drawings comprising extracting data from the shop drawings and/or from other parameter tables used to create the shop drawings that incorporate the full three-dimensional shape of the girder, including camber, sweep, end-kick, splice holes, stiffeners, and other features.

Another object of the invention is to provide an apparatus and method of constructing measurement locations on a three-dimensional model of a bridge girder that are sufficient to calculate the characteristics of the girder, including camber, sweep, end-kick, length, hole locations, stiffener locations, and other features, wherein a limited number of key measurement points are collected that are used to calculate the specific final measurements. The apparatus and methods of the invention preferably do not collect a very large density point-cloud of spatial data.

Another object of the invention is to provide an apparatus and method which make noncontact measurements of bridge girders over the full length of a typical bridge girder. The invention makes measurements with minimal or no changes to an existing shop and can operate in an open area of the fabrication shop floor. The invention can measure all sizes of girders fabricated in a typical shop, including standard size plate girders and very large tub girders. The girders may be measured in a standing, upright position supported by blocks at locations along the length of the girder. The position of these support points are measured with a three-dimensional coordinate measurement instrument ("3D CMI"). The noncontact measurements are preferably made without any special targets or markers on the girder. Splice hole locations are, therefore, measured remotely directly on the girder without requiring a special target or marker.

Another object of the invention is to provide an apparatus for providing noncontact measurements of a girder for fabricating a splice plate comprising a 3D CMI on a mobile device or moveable on a fixed device, e.g. a gantry.

Another object of the invention is to provide an apparatus that measures the data points on the girder to develop a 3D model of the girder for providing data to manufacture a splice plate. The measurements are taken directly on the girder surface by an apparatus having a 3D CMI. The measurements are taken by repositioning the apparatus at locations around the girder to obtain different fields of view. A small number of fixed points are located on the girder and measured to reposition the apparatus at the various locations around the girder. A small number of fixed points are located on the girder and measured such that the initial ideal 3D model made from the shop drawings of the girder conforms with the physical measurements of the girder.

Another object of the invention is to provide an apparatus that measures the out-of-plane deformations of the web of a bridge girder. The measurements are preferably made directly on the girder with the use of no fixed targets on the girder.

Another object of the invention is to provide an apparatus and method for processing the measurements so that standard measurements on the girder are obtained that include camber, sweep, end-kick, web panel distortions, hole locations, length, and other measurements. Such data measurements may then be stored in a computer and used to document the as-fabricated girder.

Another object of the invention is to provide an apparatus and method that uses wireless sensors placed on a girder to be measured that record temperature and vibration of the girder during measurement and use these sensor measurements with finite element models or known structural engineering analysis to correct three-dimensional girder measurements for change in length due to temperature, wherein girder acceleration is used to filter conditions where three dimensional measurements may be invalid.

Another object of the invention is to provide an apparatus and method that uses sensors on the apparatus frame that measure displacement and vibration. This sensor data is used to validate spatial measurements with the three-dimensional measurement instrument.

Another object of the invention is to provide an apparatus and method for virtually assembling multiple girders based on shop drawings or other defined assembly criteria that optimizes the alignment of the girders based on this criteria, wherein measurements of the location of existing holes in the girders are used to create a design for custom splice plates that join the girders. Using these methods, girder pairs, entire lines of girders, or entire bridges may be virtually assembled.

Another object of the invention is to provide an apparatus and method which use magnetic mounted targets on the physical girder. A small number of temporary magnetically mounted targets are placed on a girder or in stable locations around the measurement area. These targets work in conjunction with the 3D CMI and an operator work station to ensure alignment of the physical girder with the 3D CAD model. The targets also function to ensure proper alignment when repositioning the apparatus for taking measurements around the girder.

Another object of the invention is to provide an apparatus and method which use magnetically mounted validation targets that consists of known geometric features that may include steps of known height and holes of known diameter and location. The validator target is measured in conjunction with the girder measurements such that the measurement of these known quantities is used to validate and provide a level of confidence for the measurements on the girder.

The present invention is unique in that it may be applied to any bridge girder fabricated in a bridge shop and is not limited to a subset of girder types or sizes. Bridge girder fabrication typically requires measurement of a wide variety of shape and size girders, which can range from a few feet high to over 20 feet high. The present invention includes an apparatus comprising a mobile frame having a 3D CMI and an operating workstation including a processing computer, all for measuring data on a girder to create a 3D model of the girder and to develop the dimensions of a corresponding splice plate. The apparatus may further include a power source; a vertical lift for the 3D CMI and outriggers with platform stabilizers. Instead of using a mobile frame, the apparatus may include a fixed frame on which the 3D CMI is mounted and the girder to be measured is moved by some track or other mechanism relative to this frame for measurements.

Accordingly, the invention provides for the measurement of individual girders that have been completely fabricated with full-sized splice holes. Software components utilized by the apparatus then piece together the separate girder measurements virtually, thereby eliminating the need to physically lay down, align, and match-drill spliced pairs of girders. Fabricating girders with full-sized holes at different stages of the fabrication process substantially improves the fabrication process. The invention enables custom-made splice plates to be fabricated based on measurements of splice hole locations in girder pairs. The apparatus measures the precise location of splice holes in two girders that are to be joined together with a splice, manipulates the position of the girder pair to optimize the alignment, and then generates a design file for a custom-made splice plate.

Additionally, virtual assembly may be performed on multiple girders, not just a pair of girders. Most physical lay downs only involve two or sometimes three girders and setup is often dictated by available floor space. With the virtual assembly components of this invention, any number of girders may be virtually assembled. With the apparatus of the invention girders fabricated at different facilities may be virtually assembled without the need to bring girders physically together at one location.

The present invention eliminates the current process of match-drilling girders, thereby eliminating space currently required for the lay down process may allow anywhere from one-third to one-half of the existing floor space in a fabrication shop to be used for other fabrication purposes. Since the current lay down process accounts for about 15% to 20% of the cost of fabrication of a steel bridge, the present invention will save substantial expense.

Additionally, the present invention provides substantially more documentation than currently exists and provides access to types of information that is not presently available. Conventional measurements are now based on string lines, rulers, and tape measures. Most records are kept on paper, with hand-made notes made on the shop floor, and they are often subjective. This type of a manual paper record may lack detail and may be challenged easily if there are issues in fabrication. The present invention replaces subjective limited accuracy conventional measurement methods with a complete digital record. The invention may provide full-documentation of what is fabricated, much beyond what now exists. This digital record is certifiable, traceable and can be used to fully document the as-built girder at the fabrication shop. From the digital record, customized reports may be automatically generated. The measurements made by the invention are of much higher accuracy than conventional measurements.

These and other objects of the invention will be apparent from the following description of the preferred embodiments of the invention and from the accompanying drawings.

BRIEF DESCRIPTION OF THE INVENTION DRAWINGS

The following detailed description of the specific non-limiting embodiments of the present invention can be best understood when read in conjunction with the following drawings, where like structures are indicated by like reference numbers.

Referring to the drawings:

FIG. 5 shows the primary components of the apparatus of the present invention.

FIG. 10 illustrates a girder and showing small patches near the end of the girder used to define an end of a web plate and for taking measurements using the apparatus of the invention.

FIG. 12 illustrates an example of taking camber measurements using the apparatus of the invention.

DETAILED DESCRIPTION OF THE PREFERRED EMBODIMENT

The present invention is directed to apparatus and methods that accurately measure bridge girders after fabrication and include software components to virtually assemble girder pairs, or girder lines, or entire bridges by creating custom splice plates based on measured hole patterns in individual girders.

More specifically, the invention is directed to saving time and expense in manufacturing girders for bridges. The invention allows the fabrication of a girder having splice holes drilled into the girder at an early stage of the girder fabrication, e.g. before the girder is formed by welding the top and bottom flanges to the girder web and welding the stiffeners to the web, as shown for example in FIG. 2. In the process, 2D shop drawings of the girder are converted to 3D CAD drawings of the girder and input into the computer database of the apparatus, thereby providing a 3D model of the girder. The apparatus 30 as shown in FIG. 5 will then take noncontact measurements at select parts of the physical girder to the input into a computer database as discussed in detail below. An as-built 3D CAD drawing or model of the physical girder is generated by the apparatus. From this "virtual" girder, the apparatus will generate splice plate dimensions for splice plates to join girders. These dimensions are then used to create physical splice plates. A more detailed description of the apparatus and invention will now be described.

Figure 1:
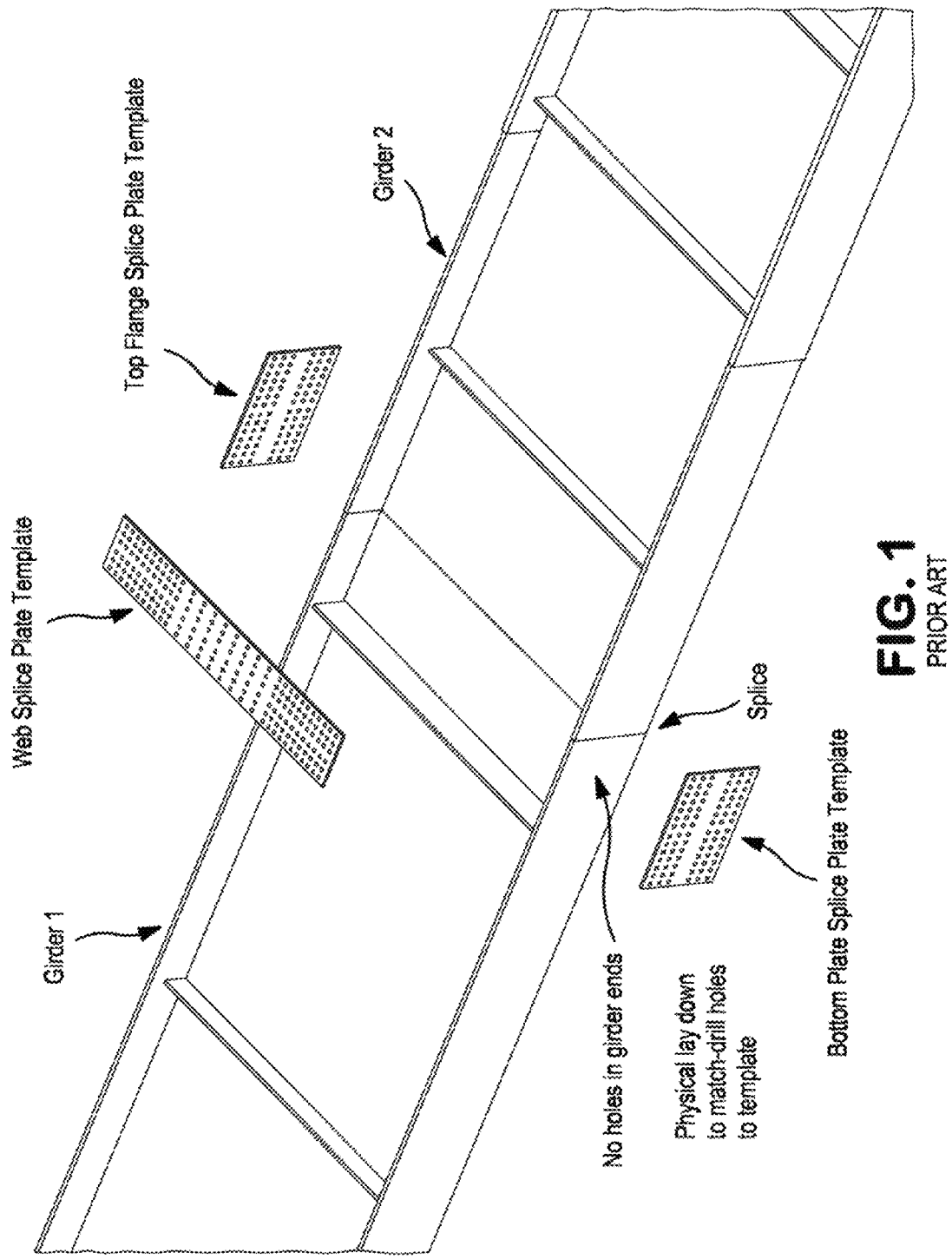
FIG. 1 shows a prior art bridge fabrication method.
Figure 2:
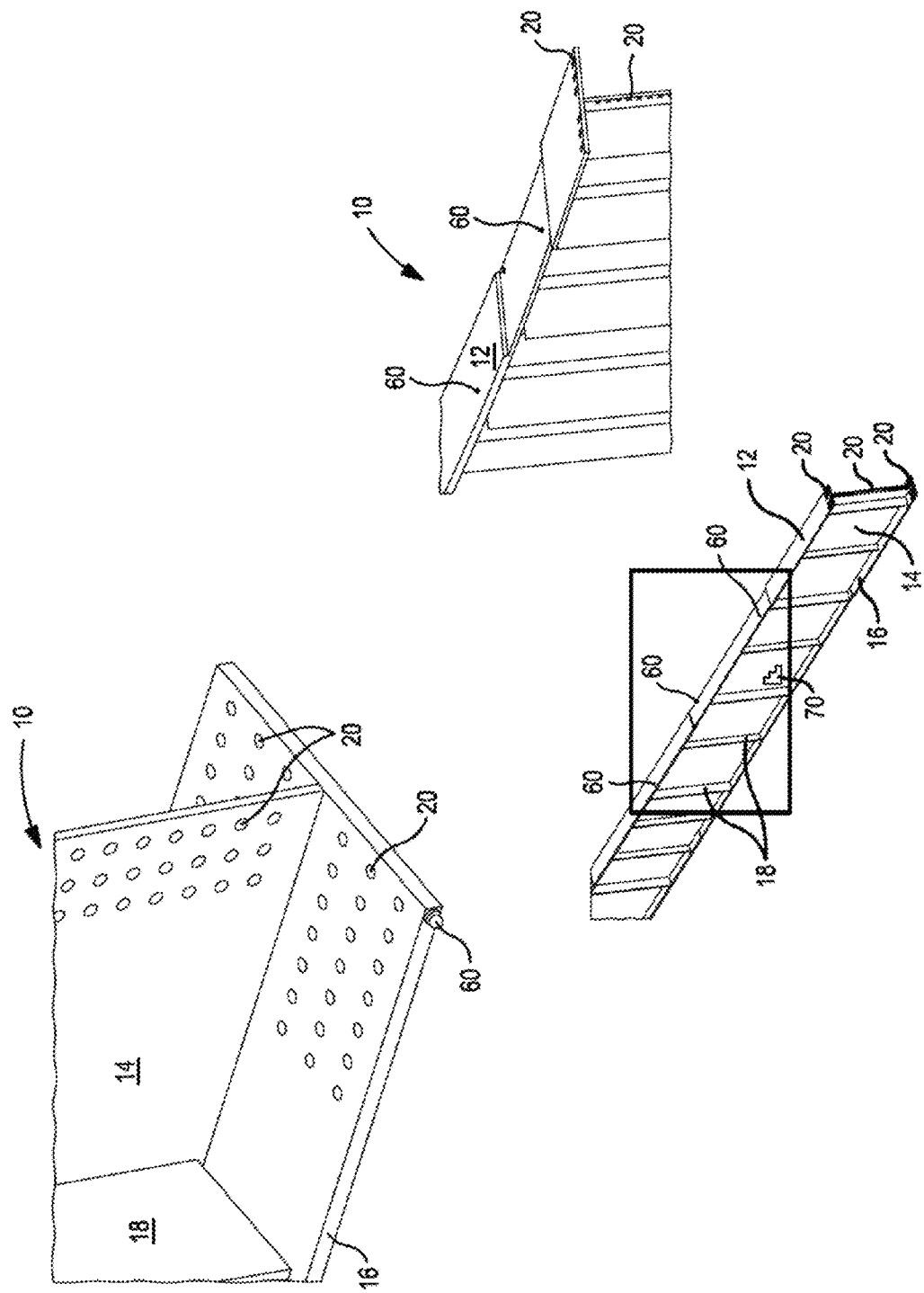
FIG. 2 shows a partial girder section.

For ease of description and understanding, FIG. 2 provides a simplified illustration of a girder 10. Girder 10 includes a top flange 12, a web 14 and a bottom flange 16. The girder includes stiffeners 18. As known to those skilled in the art, girders are fabricated in many different shapes and dimensions, all dependent on the bridge design. In using the present invention, the girder is formed having splice holes 20 in the top and bottom flanges and web. Unlike the match-drilling processes, the splice holes are made during an early stage of the girder fabrication.

Figure 3:
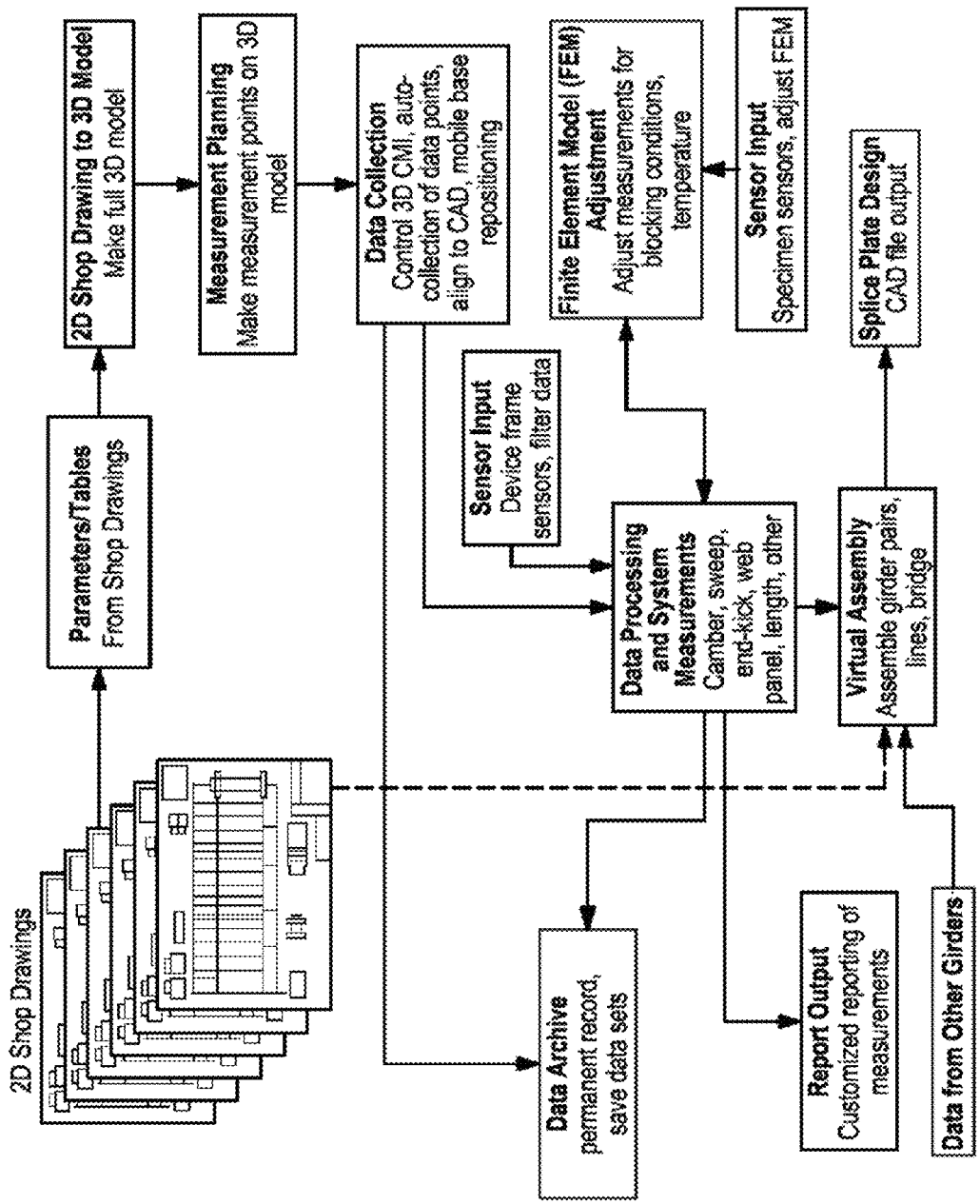
FIG. 3 is a block diagram of certain of the data processing components of the invention.
Figure 4:
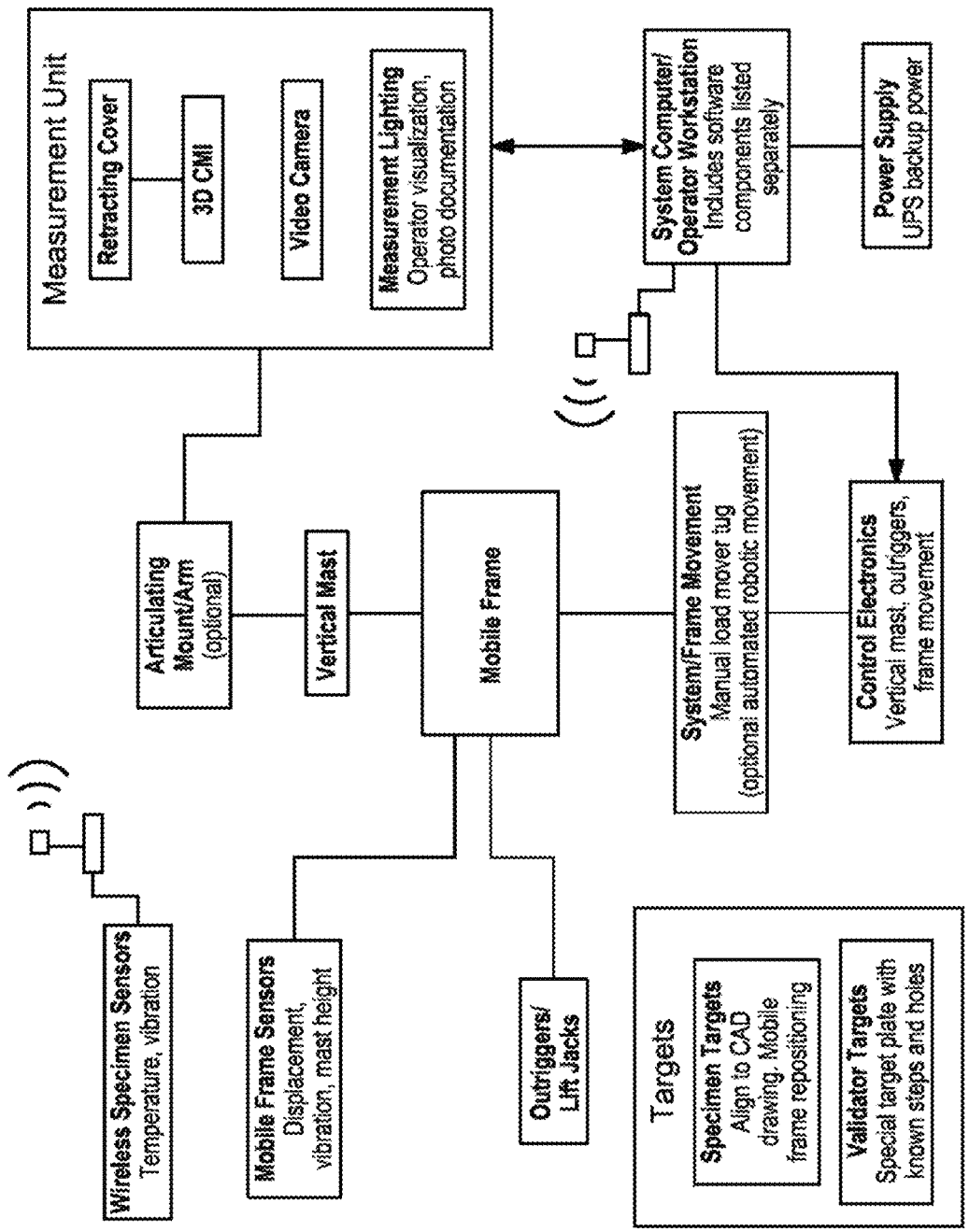
FIG. 4 is a block diagram of certain of the apparatus components of the invention.

In preface, an overview of the apparatus and methods of the invention is set forth in diagram form in FIGS. 3 and 4. FIG. 3 generally illustrates the data processing steps of the invention and FIG. 4 illustrates the apparatus components of the invention.

Referring to FIG. 5, there is disclosed the apparatus of the invention. The apparatus 30 comprises a mobile frame 32 having wheels 34; a power supply member 36; outriggers 38; platform stabilizers 40; a vertical mast 42; a 3D CMI 44; and a workstation 46. Each of these components will be described in greater detail below. Thereafter, operation of the apparatus in taking measurements of the girder will be described.

Measurements are made with a noncontact measurement instrument 44, such as a 3D CMI that can measure directly on a girder surface without requiring a special target, probe, or marker. Noncontact 3D coordinate measurements can be made with a laser-based instrument such as a Nikon Laser Radar MV350 3D CMI as referred to, for example, in U.S. Pat. No. 4,824,251 issued to Slotwinski et al.; U.S. Pat. No. 5,988,862 issued to Kacyra et al.; U.S. Pat. No. 5,202,742 issued to Frank et al.; U.S. Pat. No. 5,266,955 issued to Izumi et al.; and U.S. Pat. No. 5,724,124 issued to Kai, which patents are incorporated herein by reference. Other 3D CMI may be used as known to those skilled in the art without departing from the scope of the invention.

Since no special targets or markers are required for measurements on the girders, the entire measurement process needs no or minimal operator intervention and can be automated. A retractable cover (not shown) may be fabricated around the 3D CMI 44 to protect the instrument when not making measurements. A video camera (not shown), in addition to any video camera that may be part of the 3D CMI, is mounted near the 3D CMI to provide a video capture of the girder being measured and to assist an operator if manual measurements are needed. The video camera may also be used in remote operation or troubleshooting of the entire system in order for a person not directly located at the instrument to see what the instrument is measuring. Additional lights (not shown) may be located near the 3D CMI to aid with the video camera so that the operator may see the girder when lighting in a shop is insufficient.

Referring again to FIG. 5, the apparatus 30 is constructed on a steel frame 32 that is mobile. The footprint of the frame is compact, roughly 60 inches by 30 inches, so that it may maneuver in and around a typical bridge shop environment.

The frame may include pneumatic wheels 34 to allow the system to be moved to multiple locations in the shop, although other means for movement of the apparatus such as tracks may be used.

Mounted on top of the mobile frame is a highly stable vertical lift platform 42 that may reposition the noncontact 3D CMI 44 at different heights in order to measure different bridge girder sizes, e.g. a very tall/deep bridge girder or a very short bridge girder. Since the 3D CMI 44 must make very accurate measurements, the vertical lift platform should be stable and not creep downward over time. The apparatus may use a Serapid Telescopic Mast Unit that uses a rigid chain lift system.

The 3D CMI 44 is mounted directly on top the vertical lift mast with a custom-made mount. Alternatively, an articulating mount/arm may be mounted between the vertical lift mast and the 3D CMI 44. This articulating mount/arm provides additional degrees of freedom in positioning the 3D CMI 44 to better measure a wider range of bridge girders. This mount may tilt and/or may extend forward or backward.

Figure 6:
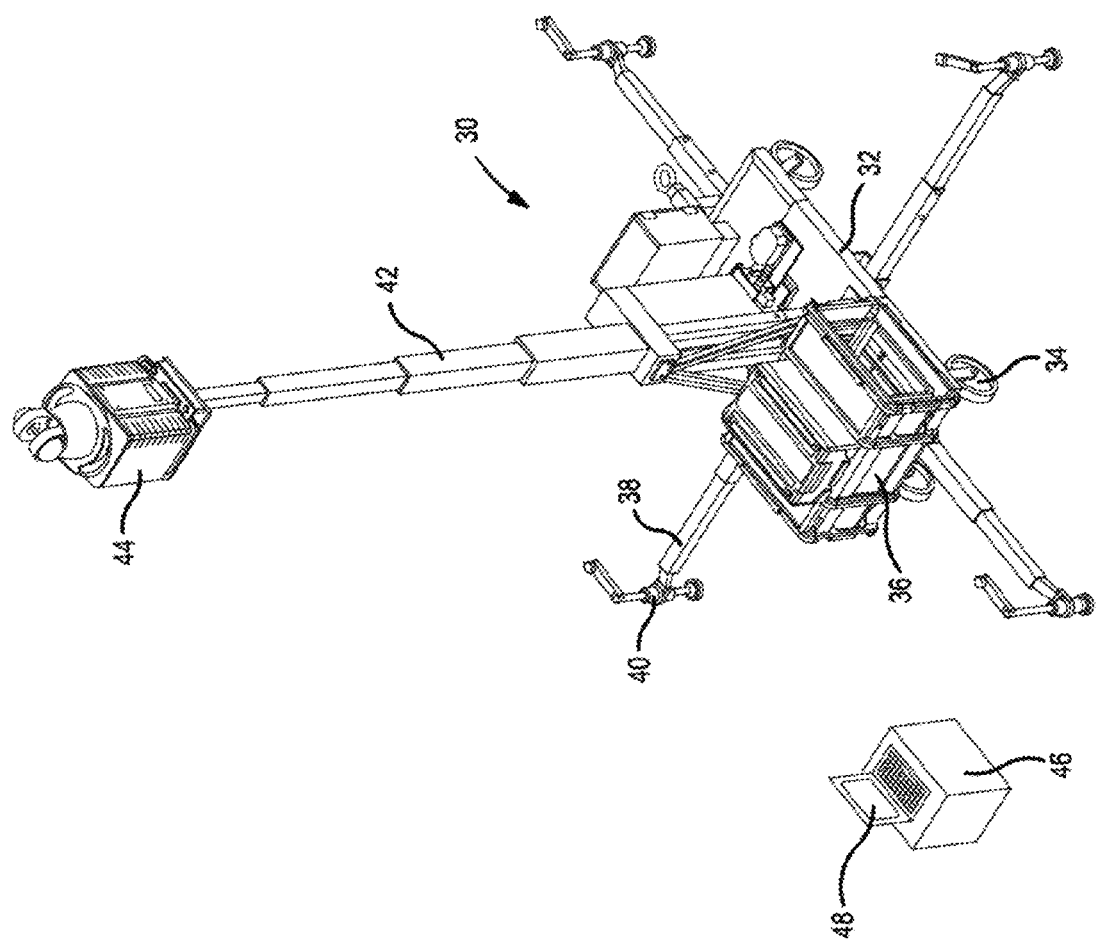
FIG. 6 illustrates the apparatus having the 3D CMI in a raised position for taking measurements.

The mobile frame 32 further includes retractable outriggers 38 that stabilize the mobile frame for measurements and provide a larger overall footprint when the vertical lift mast 42 is extended, as shown, for example, in FIG. 6. The outriggers 38 are retractable such that the overall system is smaller for movement in the shop. The outriggers 38 may be made of telescope steel tubing so that they retract under the mobile steel frame 32. When the outriggers 38 are extended for stability, lift jacks 40 raise the mobile frame so that the wheels of the mobile base are not touching the shop floor. Lifting the system off of the wheels creates a stable measurement platform needed for accurate measurements. The lift jacks 40 should be stable so as not move or creep over time. The outriggers 38 and lift jacks 40 may be manually operated or may be automatically deployed with stable ball screws or other linear actuators.

An uninterrupted power supply 36, or other form of battery power backup, is provided on the apparatus to power the apparatus.

The apparatus further comprises a workstation 46 having a processing computer 48. The computer 48 interfaces with the 3D CMI 44 to operate the instrument and to store data. The computer may process all system data and perform a range of functions as described below. The computer may operate the mechanical functions of the overall apparatus that includes mobile frame movement motors, vertical mast extending and retracting, articulating mount movement, outrigger extending and retracting, and lift jack extending and retracting. The computer further interfaces with system sensors to read, store, and manipulate data from the sensors. The computer may create virtual girder assemblies. The processing computer 48 may further implement all software functions listed above. The above software functions may also be shared with other networked processing computers for creation of reports, storing of data, virtual assembly, and other functions.

The operator workstation 46 further includes a display for the operator to visualize measurement data and three-dimensional girder models. The workstation through processing computer 48 may be used to raise and lower the vertical lift platform and to extend and retract the outriggers and stabilizers. Data collected may be stored locally in the apparatus processing computer 48.

The apparatus uses temporary targets 60 as shown in FIG. 2 as follows: (1) to align the physical girder with the 3D CAD model generated at the processing computer 48, and (2) to reposition the apparatus around the girder, as described in greater detail below and as referenced in FIG. 7. The temporary targets may comprise a rare-earth ring magnet and a 1-inch diameter steel tooling ball. The targets may have a backing fixture to prevent erroneous measurements around the target. The targets may also have an identification number. As stated, one purpose of the targets is for alignment of the physical girder to the 3D CAD model. For the initial measurement with the 3D CMI, the apparatus needs to know roughly where the girder is located in space. Typically, four targets are placed at known locations such as at the edge of the girder flanges near both ends: working end top flange near side edge, working end bottom flange near side edge, right end top flange near side edge, and right end bottom flange near side edge.

Figure 7:
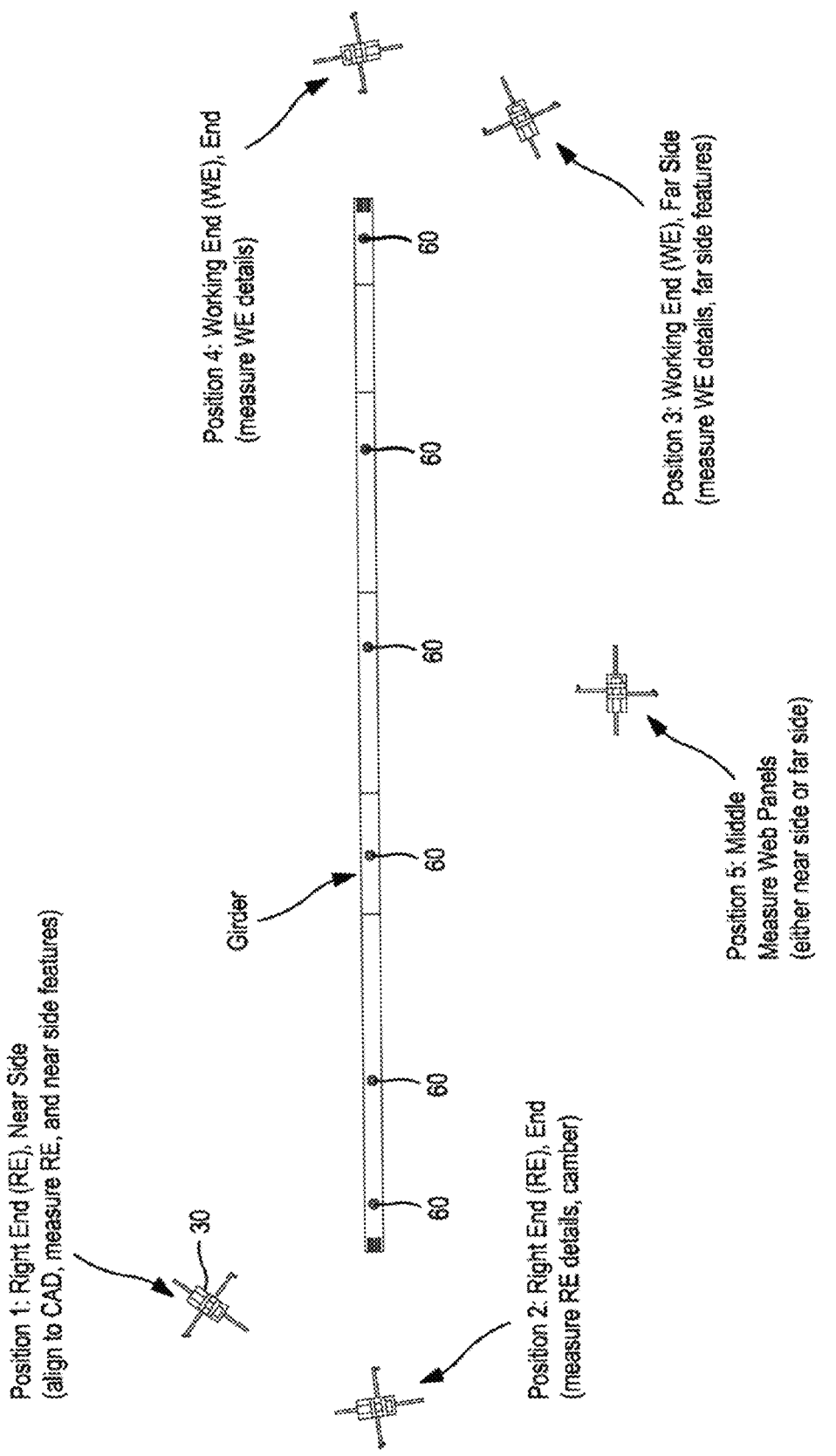
FIG. 7 illustrates one method of taking measurements of a girder using the apparatus of the present invention.

Additionally, the temporary targets are placed on the top of the top flange of a measurement girder for repositioning the mobile apparatus to different vantage points around the girder as referenced in FIG. 7 and discussed hereafter. Targets are positioned along the length of the girder at both sides of the flange. Every time the mobile base is moved, the targets are measured and used to maintain a common coordinate system.

A validator target 70, such as a step plate having precisely known step height, may be placed on the girder and is measured during the process of collecting data from the girder. This validator target contains known geometric features, such as steps of known sizes, and holes of known size and location. The purpose of this validator target is to provide a level of confidence for the girder measurements. The validator target data is embedded in the overall data file along with all other girder data.

The apparatus 30 may further comprise displacement sensors (not shown) on the mobile frame that measure the frame movement during measurements. These displacement sensors monitor the stability of the frame and indicate if the measurements are valid.

Additionally, the apparatus may further include wireless sensors (not shown) that are placed on the girder being measured, e.g. by magnetic attachement. These sensors measure vibration to determine the stability of the bridge girder during measurement and will indicate if excessive movement has occurred that would invalidate measurements. These sensors further measure the girder temperature during the duration of the 3D coordinate system measurements. The girder temperature is used to correct for changes in girder length due to temperature changes. This temperature data can be used with software components of the apparatus that use finite element models and structural engineering equations to make changes to girder measurements.

The apparatus may contain a novel collection of software components as shown, for example, in FIG. 3 that may perform the following functions: (a) converts standard two-dimensional shop drawings into a 3D model of a girder; (b) pre-plans measurements based on the 3D model of the girder; (c) automates the measurement process of the non-contact measurement instrument and collects data on the girders; (d) processes the measurements and processes engineering data, e.g. camber, sweep, end-kick, hole locations, length, web panel distortions, etc.; (e) combines measured data with finite element simulations of girder movement to correct for girder blocking conditions or other movements; (f) produces custom reports; (g) virtually assembles multiple girders and produces custom splice plate designs; and (h) stores a permanent digital record of the measure girders.

Referring again to FIG. 3, currently used bridge shop drawings are two-dimensional engineering drawings that cannot be easily converted into a 3D model. Shop drawings do not show the components drawn to scale. Given the typical sizes of girders, especially that they are typically very long compared to their height, the scale of the drawing must be distorted so that the girder can be displayed on a sheet that is readable. Shop drawings also do not directly show the girder camber and sweep. A software component is, therefore, needed to perform this conversion process. The information needed for this conversion process can be manually extracted from the 2D shop drawing or it can be automatically extracted from tables of information used to create the shop drawings. These tables of information include parameters such as the 2D camber diagram for a girder.

Once a 3D model has been created for a girder, a software component in processing computer 48 at workstation 46 will define measurement locations on the girder. Measurements are a small collection of targeted locations designed to be used for calculation of specific final measurements. Measurements are not a large high-density point cloud that needs significant post-processing. Measurement planning intended to create a series of measurement points that can then be automatically collected with the 3D measurement components of the apparatus.

Once the measurement planning software component of the apparatus defines the measurement points, a software component can interface with the 3D CMI to automatically collect the data points. Data collection is fully or near-fully automated. For all girder measurements, data is collected directly on the girder surface with no special targets or markers and no special girder preparation is required.

Referring to FIG. 7, data collection involves initial alignment of the apparatus to the physical girder using temporary targets 60 placed on the girder at crudely known positions. Data collection involves repositioning of the system at multiple locations around the girder, as seen in FIG. 7, using the temporary targets placed on the girder or in the measure area. The positioning of the apparatus is discussed below in greater detail when referencing the operation of the apparatus.

A software component of the apparatus archives all data collected for a girder. This includes the raw data of measurement points and the processed data with specific measurements, e.g. length, camber, sweep, web panel distortions, etc. Data archiving provides layers of data access that prevents changes to the original raw data in order to provide a certifiable, traceable data set.

A software component of the apparatus processes the raw measurement points and creates measurements. Measurements include length, camber, sweep, stiffener locations, and web panel distortions. The apparatus may create custom measurements to adapt to future measurement needs or specialized girders. This may include the measurement of custom bearing plates, special connection plates, or other geometric features. Raw measurements are made directly on the girder surface and are processed to produce a final desired measurement. As discussed more specifically hereafter, a relatively small number of well-defined measurements are taken, i.e. not an extremely large point cloud with millions of data points.

The measurement of girder length is currently made using rulers and tape measures. These conventional tools have limited accuracy. Length of a bridge girder is typically defined as the straight line distance between the ends of the web plate at either the top or the bottom of the web. To determine length, the ends of the web plate are measured. The girder and ambient temperature can be measured and used to correct for changes in length due to temperature or to normalize the measurement at a particular temperature. Referring to FIG. 10, small patches 80, 82, 84, 86, 88, 90 and 92 are measured near each end of the girder. Planes are fit to these patches and are used to define the ends of the web plate as shown in FIG. 11.

Referring again to FIGS. 10 and 11, localized patches are small in size, typically 2 to 4 inches by 2 to 4 inches, and contain a low number of data points, typically 9 to 36. Measurements are taken as close to the ends of the girder as possible, directly on the girder surface. A group of patches are taken at the top of the girder near the top flange. A group of patches are taken at the bottom of the girder near the bottom flange. Best-fit planes are created from the raw measurements. Intersection of planes defines points that determine the end of the web plate. These intersection points will define the end of the web plate at both the near side NS and the far side FS of the web. Since the middle of the web plate is needed, a line is defined from the intersection point at the near side NS and far side FS of the web plate. The center of this line is found and determines the end of the web plate. The center of the web plate is found at the top flange TF and bottom flange BF at both ends of the girder. Girder length is determined as the straight-line distance between the center of the web plate either at the top of the web or the bottom of the web.

Figure 11:
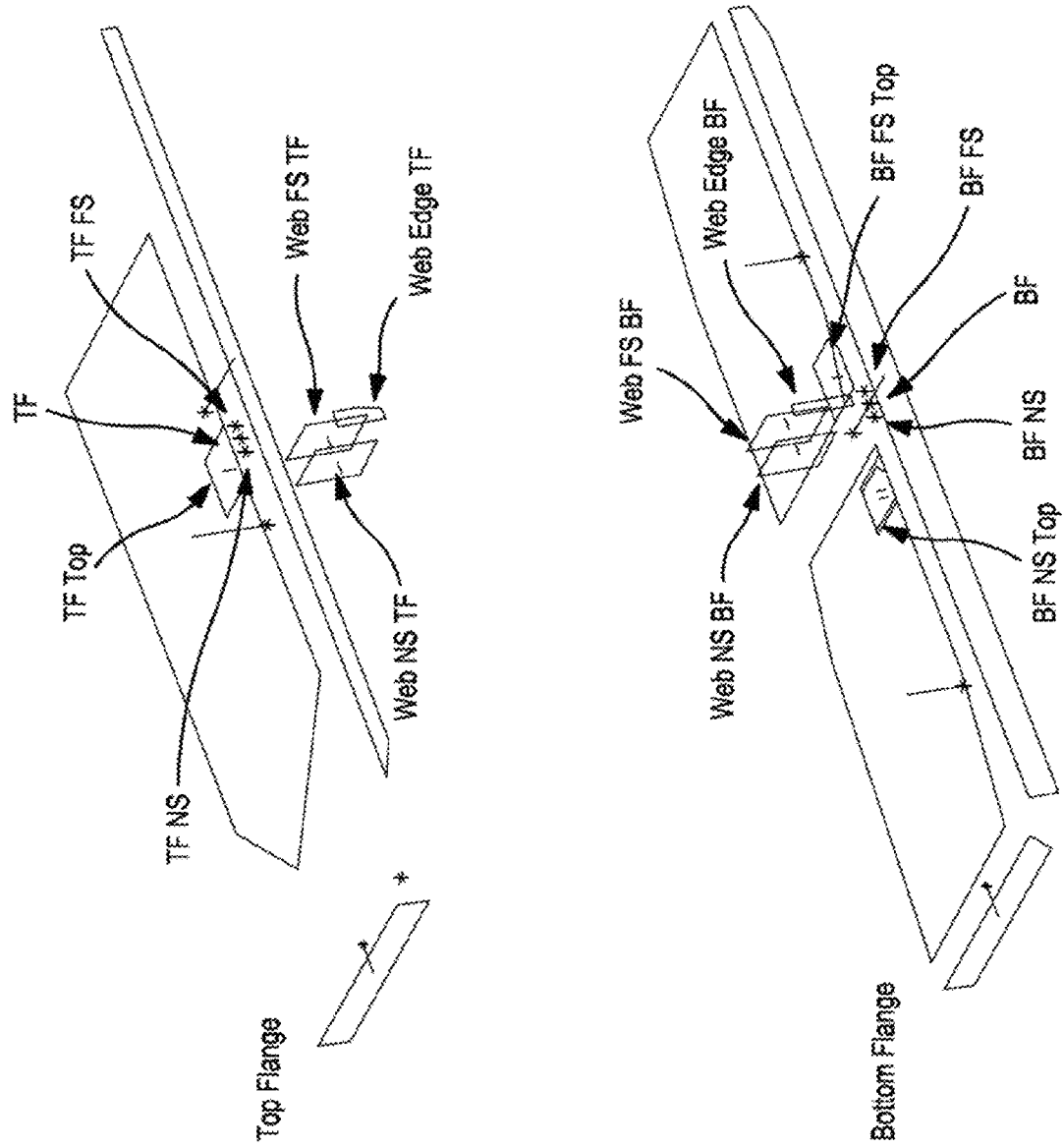
FIG. 11 illustrates an example of measurements taken of the top and bottom flanges of a girder in developing the measurements for generating a splice plate for a girder using the apparatus of the invention.

The girder web plate measured points are determined in the procedure for measuring length, as shown in FIG. 11 and referenced above. The four points defining the ends of the web plate are then used to find a best-fit plane for the web. The camber of the girder is then measured from raw measurements either on the top flange TF or the bottom flange BF, near side NS, far side FS, or both, or the top of the top flange TF. To measure camber the raw measurements must be projected on the camber plane as shown in FIG. 12.

Sweep is measured by defining a horizontal measurement plane based on measurement of the bottom flange BF. Small patches of data are taken at the ends of the girder and used to define the edges and ends of the flange plates. For example, patches at the top of the top flange, side of the top flange, end of the top flange are measured and used to define a best-fit plane. Intersection of these planes defines a point at the end of the flange, either at the near side or far side of the flange. Similar methods are used to find the four points that define the end of the top flange TF and the four points that define the end of the bottom flange BF.

A sweep plane is defined from four points that define a flange plate, such as the bottom flange plate. The four points determined as described above are used to find a best-fit plane. Raw measurements taken on the edge of the bottom flange BF, edge of the top flange TF, or side of the web plate can then be used to determine sweep. These raw points are projected on the sweep plane and become the measured sweep. By projecting raw measurements to a plane, variations in raw measurements along the girder length can be eliminated.

Stiffeners are measured by small localized patches that define the intersection points of the stiffeners with the web and flanges plates. Similar to the girder ends, small patches, typically 2 to 4 inches by 2 to 4 inches, each with a small number of points, typically 9 to 25, are measured on the girder. Patches are measured at the top and bottom of the stiffener. Patches are measured on the web near the top flange and near the bottom flange. Patches are measured on the top and bottom flange very near the stiffener. The raw patch measurements are used to find a best-fit plane. Intersection of planes is used to find lines and points where the stiffeners intersect the web and flange plates. Stiffener locations are projected to the camber plane for position along the length of a girder.

Figure 8:
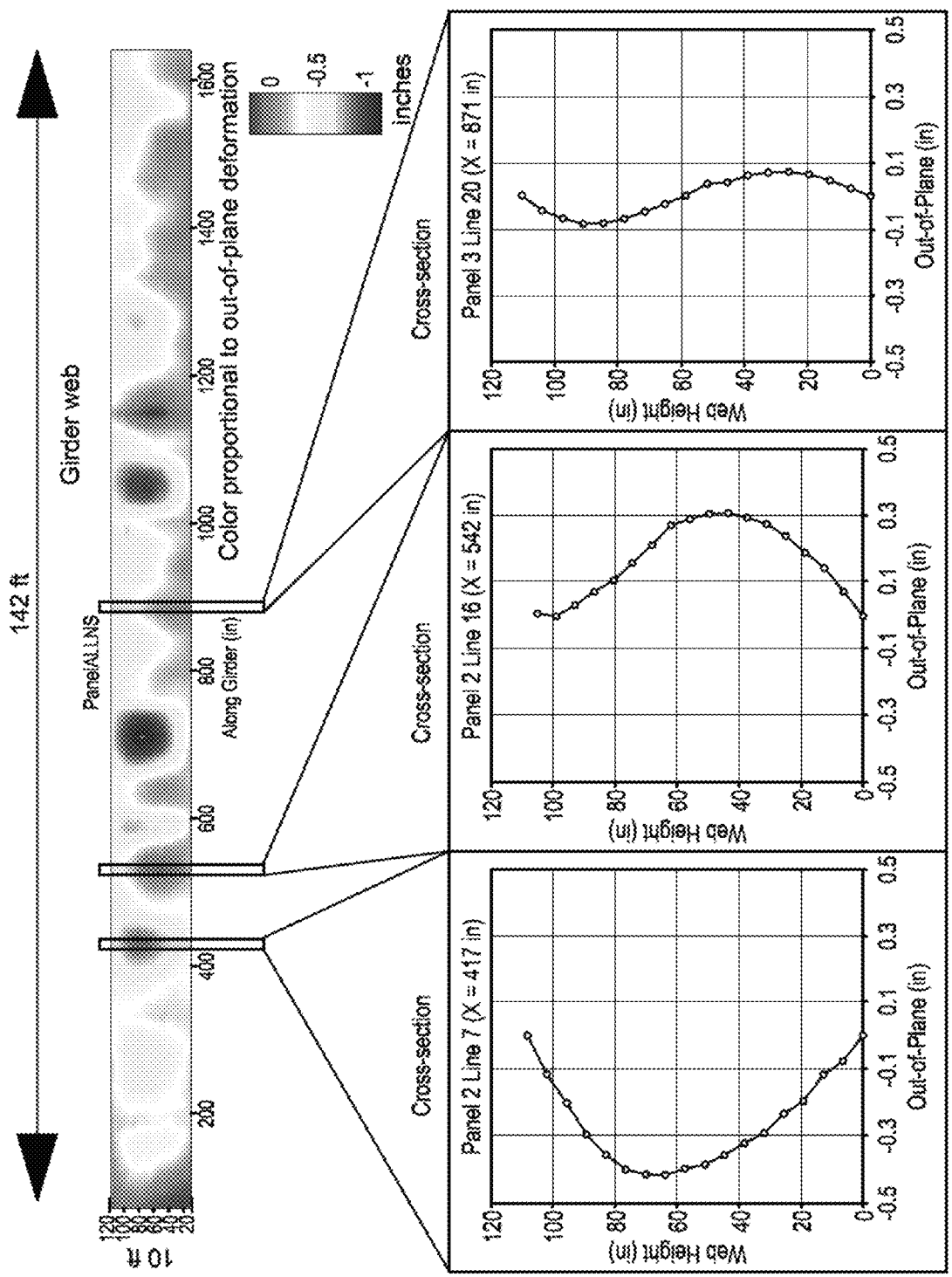
FIG. 8 illustrates an example of measurements of a girder web using the apparatus of the invention.

Web panel distortions are measured from a measurement position for an entire girder. The apparatus can make measurements directly on the girder surface and does not require a special target or the operator to manually touch the girder surface. The apparatus can make very accurate measurements of the out-of-plane deformations of the girder. The measurement data can be further processed to provide cross-sections of the girder web to visualize and quantify deformations at a particular location. This measurement replaces the currently used and highly subjective method that uses a straight edge reference and an operator manually measuring the distance from the straight edge reference to the girder web. This current manual method has limited accuracy and is very difficult to perform on very large girders. This invention can make highly repeatable, highly accurate measurements of the web deformations that provide a permanent record of the girder. The raw measurements can be processed to simulate a conventional straight-edge measurement. Vertical slices can be taken and referenced to the top and bottom of the web at each cross-section as shown, for example, in FIG. 8. This creates a localized measurement at each cross-section.

Figure 9A:
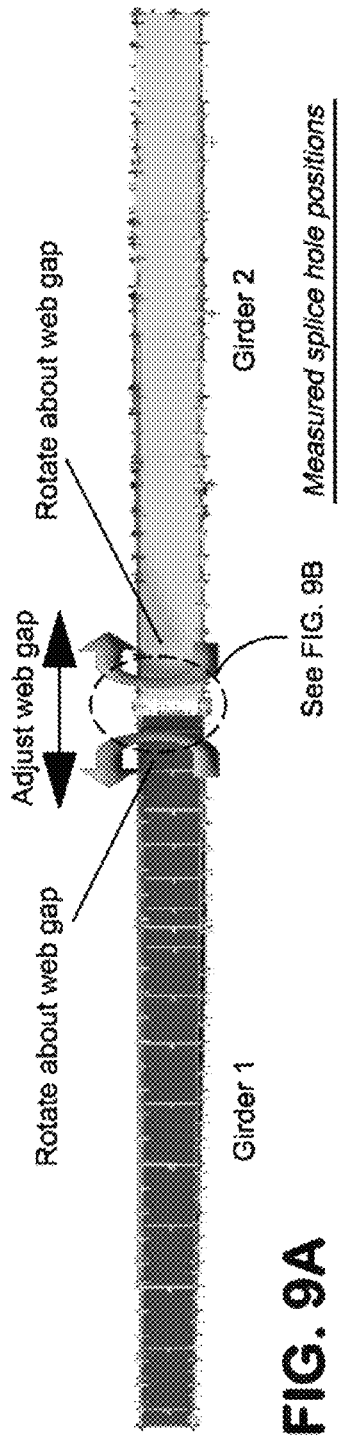
FIG. 9A illustrates an example of the virtual assembly of two girders using the apparatus of the invention.
Figure 9B:
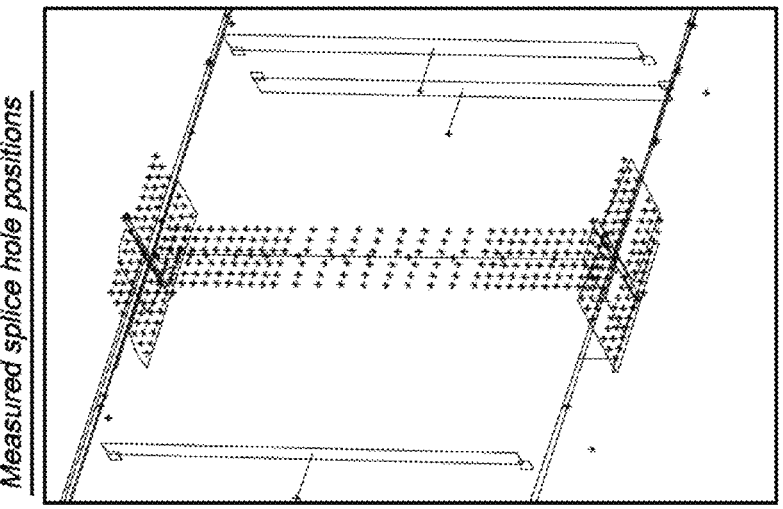
FIG. 9B illustrates a close-in view of the splice region of FIG. 9A showing the virtual assembly of two girder sections and the measured splice hole positions.
Figure 9C:
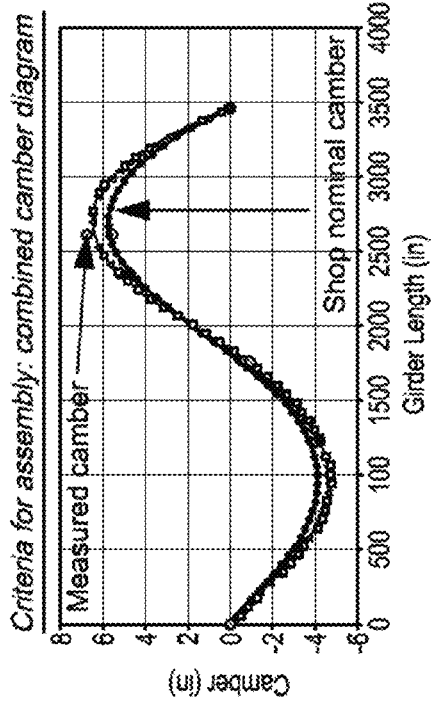
FIG. 9C illustrates an example of criteria of the bridge fabrication assembly comparing the shop design drawings to the measured girder.

More specifically, referring to FIGS. 9A-9C, there is shown an example of the measurement which may be taken by the apparatus 30 of the invention and a generated 3D CAD model of a girder. FIG. 9A illustrates girders 1 and girder 2 brought together. The girders rotate about a web gap. FIG. 9B is taken along line 9B-9B of FIG. 9A and illustrates the measured splice hole positions of girder 1 and girder 2. The splice hole position of the girder assembly will be used to generate the dimensions for the girder splice plates and to fabricate the girder splice plates. FIG. 9C illustrates an example generated by the apparatus showing the criteria for the girder assembly and illustrating a combined camber diagram of the nominal camber from the shop drawings and the actual measured camber from the measurements of the actual girder using the apparatus of the invention.

The apparatus allows for finite element model adjustment. Specifically, a software component of the apparatus manipulates the raw measurements on the girder to adjust for both changes in girder shape due to blocking and for changes in length due to temperature. More specifically, girders may be measured in the standing position with the girder resting on blocks under the girder. The position of these blocking locations can result in changes in shape of the girder as the girder will deflect and change shape due to gravity. The apparatus measures the location of the blocking points with respect to the girder. The finite element modeling (FEM) component of the apparatus may perform at least two functions. First, the FEM component may determine if the measured blocking locations result in appreciable deflection. Second, if the girder does experience appreciable deflection, the FEM component may adjust the shape of the measured girder to compensate for this deflection based on known structural engineering analysis.

The apparatus further includes a report output component. A software component of the apparatus creates custom-made reports for the end user. The reports may include all measured data such as length, camber, sweep, stiffener locations, and web panel distortions.

The apparatus further allows for "virtual" assembly of girders. Specifically, processed data from multiple girders may be combined together to perform a virtual assembly. Virtual assembly is analogous to the physical lay down process, but can be done virtually using software components incorporated in the apparatus instead of physically. The output of the virtual assembly component is a design for a custom splice plate that will join pairs of girders. Splice plate design files can be outputted in a variety of formats that includes a DXF file that can be directly sent to a CNC drilling machine to fabricate the plate.

The virtual assembly component of the apparatus is provided input from the shop drawings that defines how the girders are to be fit together. This is typically provided in the form of a line camber diagram or a combined camber diagram for a girder pair. The software component of the apparatus will adjust the position and orientation of girders to optimize the fit to the nominal camber diagram provided from the shop drawings. The software component adjusts the separation of the girder, defined as the web gap, and the angle of the girders rotated in the plane of the web, all as shown for example in FIGS. 9A and 9B.

Virtual assembly may be performed on different combinations of girders. A pair of girders can be virtually assembled. An entire line of girders can be virtually assembled. Multiple lines of girders can be virtually assembled.

The following describes how the invention is used to measure one girder. The girder to be measured is placed in the measurement area, a clear area of the shop floor. The girder is placed upright crudely blocked along its length at multiple points. The apparatus will be moved to multiple positions around the girder to take measurements. These measurement positions are shown in FIG. 7. FIG. 7 lists the basic steps of operation of the system, including:

1. Preparation of data sets, including:
   a. taking input from the shop drawings manually or through parameter table,
   b. using software components of the apparatus to build a 3D model for the girder, and
   c. using software components of the apparatus to perform measurement planning to lay out measurement points on the girder;
2. Initial setup, including:
   a. placing wireless sensors on the girder whereby the apparatus collects sensor data during measurements,
   b. placing CAD alignment targets 60 on the girder which typically may include 4 targets,
   c. placing repositioning targets on the top of the top flange of the girder, or using other targets in the measurement area, whereby 4 to 8 targets are typically used and these targets are used solely and/or primarily for repositioning of the measurement apparatus and are not used for any measurements, and
   d. placing a validator target on the girder;
3. Place the apparatus in a Position 1 as shown in FIG. 7, i.e., right end, near side, including:
   a. aligning the 3D CAD model and measuring the CAD alignment targets and performing the alignment,
   b. data collection software components of the apparatus collect data, including measuring the right end of the girder web holes, girder end surfaces, features on the near side of the girder, i.e. stiffener locations, bottom flange camber, and sweep, and
   c. measuring the repositioning targets;

4. Reposition the system to Position 2, i.e. the right end, end,
   a. measuring the repositioning targets and maintaining a common coordinate system,
   b. data collection software components of the apparatus collect data, including measuring right end of the girder top flange and bottom flange holes, right end surfaces, camber on the top flange, and
   c. measuring the repositioning targets;
5. Reposition the system to Position 3, i.e. the working end, far side,
   a. measuring the repositioning targets and maintaining a common coordinate system,
   b. data collection software components of the apparatus collect data, including measuring the working end of the girder web holes, girder end surfaces, camber on the bottom flange far side top, features on the far side, i.e. the stiffener locations, sweep, and
   c. measuring the repositioning targets;
6. Reposition the system to Position 4, i.e. the working end, end,
   a. measuring the repositioning targets and maintaining a common coordinate system
   b. data collection software components of the apparatus collect data, including measuring the working end of the girder top flange and bottom flange holes, working end surfaces, camber on the top flange, and
   c. measure the repositioning targets; and
7. Reposition the system to Position 5, i.e. the middle, either near or far side,
   a. measuring the repositioning targets and maintaining a common coordinate system,
   b. data collection software components of the apparatus collect data including measuring web panel distortions, camber from top of top flange,
   c. measuring a validator target, and
   d. measuring blocking locations;

Data collection is now completed for one girder, the raw data file is locked to prevent any changes in the data. Data processing is now undertaken including the software components of the apparatus processing the data to measure camber sweep, length, end-kick, and web panel distortions. Additional software components use finite element model tools to adjust measurements for blocking locations and girder temperature. A report is created using software components to create custom-defined reports with measurement data. Thereafter, virtual assembly is undertaken by combining individual data sets from multiple girders to virtually assemble and create splice plate design files. These files are then used in physically creating the splice plates for the bridge fabrication.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An apparatus for steel bridge fabrication, including the fabrication of splice plates for joining at least two bridge girders, the apparatus comprising:
   a 3D coordinate measurement instrument for taking measurements of at least two bridge girders having splice holes fabricated therein wherein said measurements include for each of said at least two bridge girders (a) measuring splice hole locations at a girder end and measuring surfaces of the girder end thereby characterizing the girder end, (b) measuring the length of the girder, and (c) measuring camber along the length of the girder,
   a processing computer for receiving said measurements of said at least two bridge girders having splice holes fabricated therein wherein said processing computer will through computer software manipulate said measurements of said at least two bridge girders including adjusting a web gap between said at least two girder ends of said at least two bridge girders and rotating said at least two girder ends about a common plane of a web of each of said at least two bridge girders, and
   wherein said processing computer generates a 3D model of said at least two bridge girders having splice holes fabricated therein and further generates the dimensions of one or more splice plates, including generating the splice hole locations on the one or more splice plates, for the fabrication of said one or more splice plates.

2. The apparatus of claim 1 further comprising means for positioning said 3D coordinate measurement instrument around said at least two bridge girders having splice holes fabricated therein for taking measurements of said at least two bridge girders at different locations around said at least two bridge girders.

3. The apparatus of claim 2 wherein said means for positioning said apparatus around said at least two bridge girders having splice holes fabricated therein comprise a mobile means for positioning said 3D coordinate measurement instrument or a fixed means on which said 3D coordinate measurement instrument is mounted.

4. The apparatus of claim 1 further comprising a mobile frame having means for moving said apparatus and a vertical lift member upon which said 3D coordinate measurement instrument is attached.

5. The apparatus of claim 4 further comprising a power source for said apparatus.

6. The apparatus of claim 5 further comprising outriggers and platform stabilizers connected to said outriggers.

7. The apparatus of claim 6 further including specimen targets for aligning the 3D model of said at least two bridge girders with said at least two bridge girders and for coordinating alignment of the 3D model of said at least two bridge girders when repositioning said apparatus around said at least two bridge girders.

8. The apparatus of claim 6 further comprising mobile frame sensors for measuring displacement, vibration and/or mast height of said apparatus.

9. The apparatus of claim 6 further comprising validator targets for placement on said at least two bridge girders for validating the measurements taken and processed by said apparatus.

10. The apparatus of claim 1 wherein said processing computer generates from said measurements the camber, sweep, end-kick, splice hole locations, length and/or web panel distortions of said at least two bridge girders.

11. The apparatus of claim 1 wherein said apparatus takes said measurements at small patches of said at least two bridge girders wherein said small patches are in the range of about 2 to 4 inches by 2 to 4 inches and having low number of data points wherein said low number of data points comprise about 9 to 36 data points.

12. The apparatus of claim 1 further comprising software components which perform functions selected from the group consisting of: converting standard two-dimensional shop drawings into a three-dimensional model of a girder; pre-plans measurements based on the three-dimensional model of the girder; processes the measurements and processes engineering data, including camber, sweep, end-kick, hole locations, length, and web panel distortions; combines measured data with finite element simulations of girder movement to correct for girder blocking conditions or other movements; produces custom reports; virtually assembles multiple girders; and stores a permanent digital record of the measured girders.

13. A method of fabrication of splice plates for joining at least two bridge girders in steel bridge fabrication comprising steps of:

taking measurements of at least two bridge girders having splice holes fabricated therein using an apparatus having a 3D coordinate measurement instrument wherein said measurements include for each of said at least two bridge girders (a) measuring splice hole locations at a girder end and measuring surfaces of the girder end thereby characterizing the girder end, (b) measuring the length of the girder, and (c) measuring camber along the length of the girder, a processing computer for receiving said measurements of said at least two bridge girders having splice holes fabricated therein wherein said processing computer will through computer software manipulate said measurements of said at least two bridge girders including adjusting a web gap between said at least two girder ends of said at least two bridge girders and rotating said at least two girder ends about a common plane of a web of each of said at least two bridge girders, and wherein said processing computer generates a 3D model of said at least two bridge girders having splice holes fabricated therein and further generates the dimensions of one or more splice plates, including generating the splice hole locations on the one or more splice plates, for the fabrication of said one or more splice plates.

14. The method of claim 13 wherein said apparatus further comprise a mobile frame having means for moving said apparatus, a vertical lift member upon which said 3D coordinate measurement is attached, a power source and outriggers with platform stabilizers.

15. The method of claim 13 wherein the apparatus is positioned at one or more different positions for taking said measurements of said at least two bridge girders.

\* \* \* \* \*